United States Patent
Fischer et al.

(10) Patent No.: US 9,127,169 B2
(45) Date of Patent: Sep. 8, 2015

(54) DARK METAL EFFECT PIGMENTS PRODUCED BY MEANS OF A PHYSICAL VAPOUR DEPOSITION (PVD) METHOD

(75) Inventors: Martin Fischer, Neuhaus (DE); Wolfgang Herzing, Neunkirchen (DE); Bernhard Geissler, Schwarzenbruck (DE); Ralph Schneider, Lauf (DE)

(73) Assignee: ECKART GMBH (DE)

( * ) Notice: Subject to any disclaimer, the term of this patent is extended or adjusted under 35 U.S.C. 154(b) by 974 days.

(21) Appl. No.: 12/278,600

(22) PCT Filed: Feb. 14, 2007

(86) PCT No.: PCT/EP2007/001280
§ 371 (c)(1),
(2), (4) Date: Aug. 7, 2008

(87) PCT Pub. No.: WO2007/093401
PCT Pub. Date: Aug. 23, 2007

(65) Prior Publication Data
US 2009/0013906 A1    Jan. 15, 2009

(30) Foreign Application Priority Data
Feb. 14, 2006 (DE) .......................... 10 2006 007 151

(51) Int. Cl.
C04B 14/04 (2006.01)
C09C 1/62 (2006.01)
C09C 1/00 (2006.01)
C09C 1/40 (2006.01)
C09C 1/64 (2006.01)

(52) U.S. Cl.
CPC ... *C09C 1/62* (2013.01); *C09C 1/00* (2013.01); *C09C 1/0003* (2013.01); *C09C 1/407* (2013.01); *C09C 1/64* (2013.01); *C09C 1/642* (2013.01); *C01P 2002/85* (2013.01); *C01P 2004/61* (2013.01); *C01P 2006/62* (2013.01)

(58) Field of Classification Search
USPC ................ 106/401, 482; 423/592.1, 607, 625
See application file for complete search history.

(56) References Cited

U.S. PATENT DOCUMENTS 2,839,378 A    6/1958   McAdow
2,941,894 A    6/1960   McAdow
(Continued)

FOREIGN PATENT DOCUMENTS

DE    101 51 375 A1    2/2003
DE    103 15 775 A1    10/2004
(Continued)

OTHER PUBLICATIONS

Birtill, J.J. et al. "Thermochemistry of Hydrogen Molybdenum Bronze Phases HxMoO3", Journal of Solid State Chemistry, vol. 29 (1979) pp. 367-372.*
(Continued)

*Primary Examiner* — Kaj K Olsen
*Assistant Examiner* — Ross J Christie
(74) *Attorney, Agent, or Firm* — Ostrolenk Faber LLP

(57) ABSTRACT

The invention relates to a metallic effect pigment, which metallic effect pigment has a substantially homogeneous chemical composition comprising at least one metal M and having an average content of oxygen of from 25 to 58 atomic percent, based on the total content of M and oxygen. The invention further relates to a method for the production of said metallic effect pigment.

18 Claims, 2 Drawing Sheets

(56) References Cited

U.S. PATENT DOCUMENTS

| | | | |
|---|---|---|---|
| 3,078,149 | A | 2/1963 | Barber |
| 4,321,087 | A | 3/1982 | Levine et al. |
| 5,320,782 | A | 6/1994 | Okuda et al. |
| 5,766,827 | A | 6/1998 | Bills et al. |
| 7,157,116 | B2 | 1/2007 | Weinert |
| 2001/0036056 | A1 | 11/2001 | Kimmel et al. |
| 2003/0129404 | A1* | 7/2003 | Argoitia et al. ............... 428/403 |
| 2006/0070552 | A1 | 4/2006 | Loch et al. |
| 2006/0118663 | A1 | 6/2006 | Herzing |
| 2006/0165620 | A1 | 7/2006 | Bujard et al. |
| 2007/0199478 | A1 | 8/2007 | Schlegl et al. |
| 2007/0281136 | A1* | 12/2007 | Hampden-Smith et al. ......................... 428/195.1 |
| 2008/0268256 | A1* | 10/2008 | Nagano et al. ................. 428/413 |
| 2008/0306210 | A1* | 12/2008 | Glockner et al. ............. 524/726 |
| 2009/0030113 | A1* | 1/2009 | Glockner et al. ............. 523/160 |

FOREIGN PATENT DOCUMENTS

| | | |
|---|---|---|
| DE | 103 46 167 A1 | 5/2005 |
| EP | 0 481 460 A2 | 4/1992 |
| EP | 1 522 606 A | 4/2005 |
| FR | 2 151 636 A | 4/1973 |
| JP | 57-073178 | 5/1982 |
| JP | A-58-219265 | 12/1983 |
| JP | A-H02-092824 | 4/1990 |
| JP | A-H05-098195 | 4/1993 |
| JP | A-2001-247823 | 9/2001 |
| JP | 2002-322561 | 11/2002 |
| JP | A-2002-362923 | 12/2002 |
| JP | A-2003-160741 | 6/2003 |
| JP | A-2004-532334 | 10/2004 |
| JP | 2005-536562 | 12/2005 |
| WO | WO 99/35194 | 7/1999 |
| WO | WO 00/24946 | 5/2000 |
| WO | WO 02/090613 A2 | 11/2002 |
| WO | WO 03/046245 A2 | 6/2003 |
| WO | WO 2004/026971 A1 | 4/2004 |
| WO | WO 2004/026972 A1 | 4/2004 |
| WO | WO 2005/064035 A1 | 7/2005 |

OTHER PUBLICATIONS

International Search Report dated Sep. 5, 2007 issued in correspondin PCT Application No. PCT/EP2007/001280.

Rehner, Thomas and Klimits, Ladislaus: "A contribution to determining the specific surface area of leafing aluminum flake pigments in paste form," Farbe Und Lack, 62(10), 1956, pp. 464-468, with English Translation.

Rehner, Thomas: "New method of determining the covering capacity of leafing metal pugments on water," Farbe Und Lack, 71(8), 1965, pp. 649-655, with English Translation.

Rodrigues, A.B.J. "Metallic flop and its measurement," JOCCA, (1992(4)) pp. 150-153.

Notice of Reasons for Rejection dated Mar. 27, 2012 in corresponding Japanese Patent Application No. 2008-553697 (with English translation).

Notice of Reasons for Rejection dated Jul. 2, 2013 in corresponding Japanese Patent Application No. 2008-553697 (with English language translation).

* cited by examiner

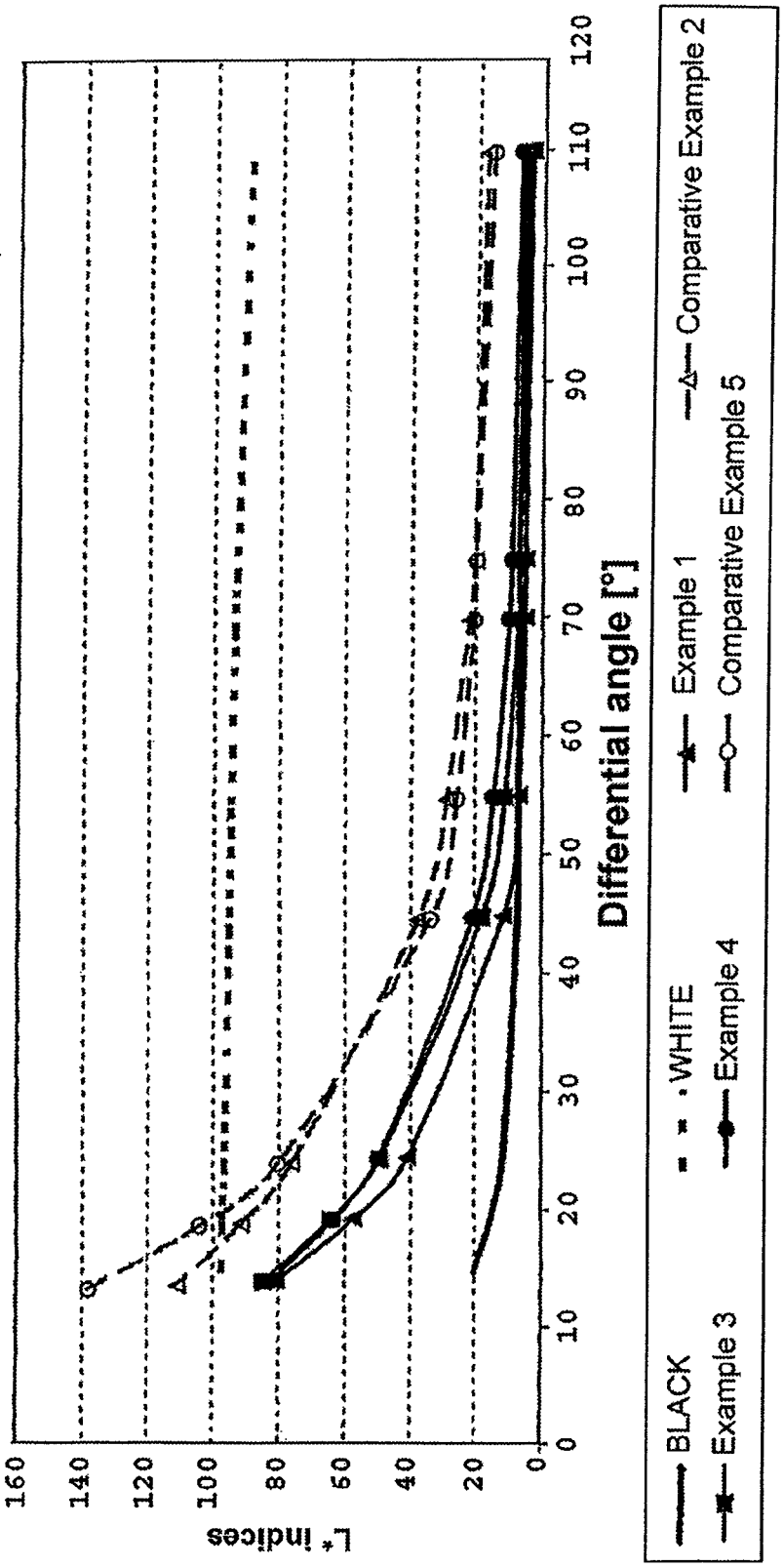

DARK METAL EFFECT PIGMENTS PRODUCED BY MEANS OF A PHYSICAL VAPOUR DEPOSITION (PVD) METHOD

CROSS REFERENCE TO RELATED APPLICATIONS

The present application is a 35 U.S.C. §371 National Phase conversion of PCT/EP2007/001280, filed Feb. 14, 2007, which claims benefit of German Application No. 10 2006 007 151.4, filed Feb. 14, 2006, the disclosure of which is incorporated herein by reference. The PCT International Application was published in the German language.

Metal effect pigments produced by PVD methods have been known for some time. They are characterized by extremely high luster, very good covering capacity, and unique optical properties. Due to their small thickness (approx from 30 to 70 nm) and their extremely smooth surfaces, they tend to cling very closely to their substrates after being applied thereto. This results in a mirror-like appearance when the substrates are very smooth.

Among pure metal effect pigments, only aluminum pigments are commercially well known to date. Examples include Metalure® (produced by Avery Dennison, distributed by ECKART), Decomet® (Schlenk), or Metasheen® (Ciba).

Such pigments provide color shade "silver" at its best.

Pigments produced in this way by PVD techniques on the basis of metal layers have been described in detail in U.S. Pat. No. 2,839,378 "Method of making metal flakes". This patent specification describes the production of mirror-like pigments, which have extremely small layer thicknesses and are vapor-deposited onto a substrate provided with a "release layer". After the metal layers have been applied and the resulting folie has been stripped, the pigments are comminuted to the desired particle size by subjecting them to mechanical stresses.

The use of pigments thus produced in coating formulations is described in detail in U.S. Pat. No. 2,941,894 "Metallised coating compositions". This patent specification highlights the high reflectivity, low pigmentation level, and the high covering capacity of the pigments.

The method for producing metallic pigments having a thickness ranging from 35 to 45 nm by means of vapor deposition is described in U.S. Pat. No. 4,321,087 in greater detail and involves the application of a release coat, the metallization technique, the method of detachment in a solvent bath and of concentrating the particles, and the use of ultrasonic comminution to give the desired pigment size.

Patent application PCT/US99/24782 in the name of Avery describes the possibility of a multilayered structure consisting of layers of pigment material and release coat layers, and PCT/US02/14161 discloses a technique in which a method for continuous coating using an external supply of release coat material can be carried out more effectively by means of a wire coated with polymer. PCT/US02/38292 discloses the possibility of a unit for combined coating and stripping, these operations being separately carried out under subatmospheric pressure.

WO2004/026971 and WO2004/026972 relate to highly lustrous, gold-colored metal-effect pigments which comprise a copper-based alloy and other metal alloy components and which are produced by detaching and comminuting metal foils deposited in vacuo.

Likewise, pigments having a metallic luster and whose chromaticity is based on interference and which display a multilayered structure have been known for a considerable time. The optical principle underlying these pigments is the Fabry Perot interference effect. The products generally comprise alternating dielectric and metal layers. The pigments have exceptionally high color flops.

One major disadvantage of these pigments is that their particles are relatively thick as a result of the multilayered structure. This inevitably leads to decreased coverage and decreased covering capacity.

All of the effect pigments disclosed in the above citations suffer from the disadvantage that they, as metal pigments, provide only a silver or golden color impression or, in the case of interference pigments, an optically variable color impression.

But there is an increasing need for rich black or gray effects. Thus, for example, black or gray effect enamels are highly sought after in the automotive industry. These effect enamels are made of a mixture of usual black pigments such as carbon black pigments and conventional metal pigments, in particular, aluminum pigments. The term "conventional metal pigments" means pigments that are obtained by grinding processes. Such pigments are differentiated as "cornflake" and "silver dollar" types of metal pigments.

There has been no dearth of experiments aimed at increasing the spectrum of black effect pigments. DE 103 46 167 A1, for example, discloses lustrous black interference pigments comprising a coating composed of magnetite and a colorless coating having a refractive index of n<1.8. However, these pigments lack the covering power of metallic pigments and their typical metallic flop.

Finally, EP 1 522 606 A1 discloses a method for producing a black aluminum oxide foil. This foil is predominantly used for laser marking purposes. Here, metallic properties like high luster are undesirable and can be prevented by carrying out post-oxidation. Said specification makes no mention of effect pigments.

Furthermore, WO 2005/064035 A1 discloses thin platelets made of a dielectric material. But these dielectric materials are not metals having metallic properties.

It is an object of the present invention to provide metallic effect pigments which display novel dark to black color effects. They are intended to provide a black impression and at the same time have high luster and a pronounced brightness flop.

Another object of the invention is to find a method for producing such pigments.

This object is achieved by the provision of a metallic effect pigment of substantially homogenous chemical composition comprising at least one metal M and an average content of oxygen ranging from 25 to 58 atomic percent, based on the total content of M and oxygen.

Furthermore, the object is achieved by a method comprising the following steps:
a) vapor-coating a substrate in a vacuum chamber by means of physical vapor deposition (PVD) with at least one metal M in the presence of oxygen forming a metal layer on the substrate, which metal layer is of a substantially homogeneous chemical composition comprising an average content of oxygen ranging from 25 to 58 atomic percent, based on the total content of M and oxygen,
b) detaching the metal layer from the substrate,
c) comminuting the metal layer to produce effect pigments,
d) optionally converting the metallic effect pigments to a dispersion or paste.

BRIEF DESCRIPTION OF THE DRAWINGS

FIG. 2 is a graphical representation showing the colorimetric readings-L* indices for Example 1, Comparative Example 2, Example 3, Example 4 and Comparative Example 5.

Figure 1:
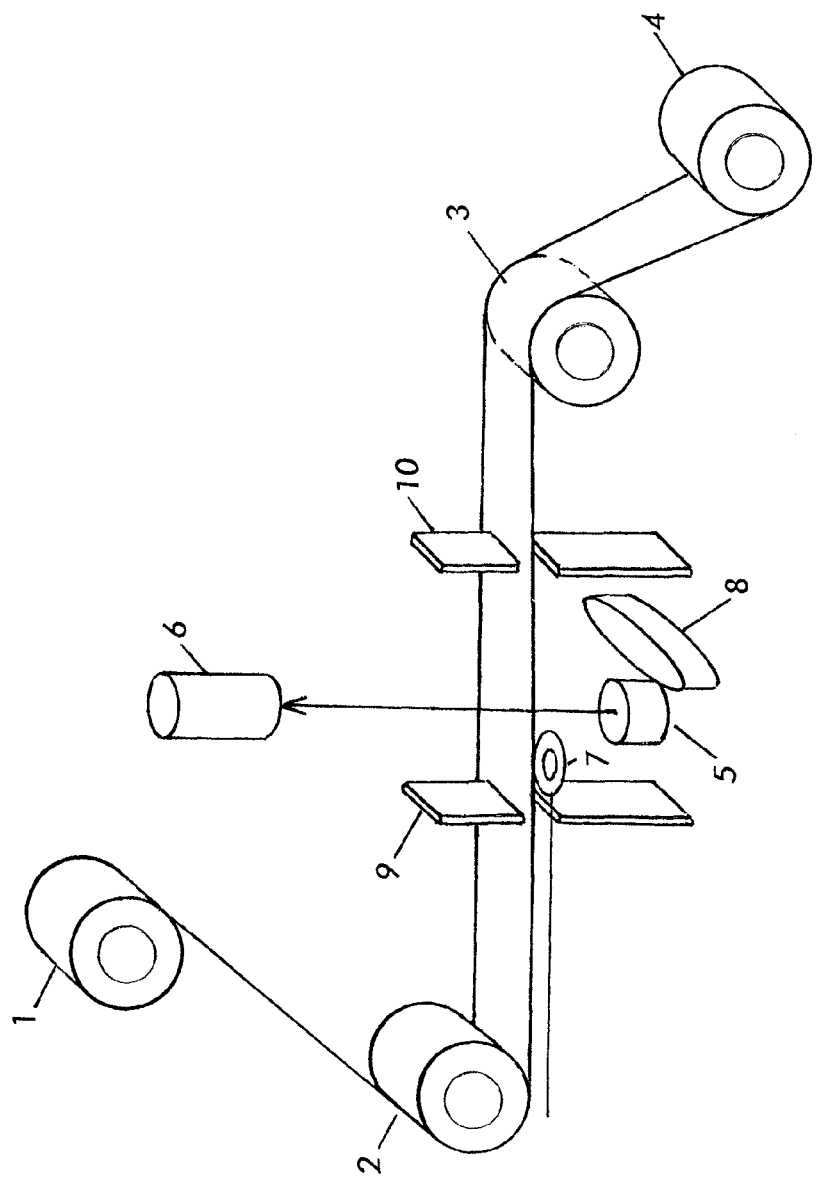
FIG. 1 is a diagrammatic representation of a conveyor belt system for use in forming the metallic effect pigments of the invention.

Articles coated with effect pigments always exhibit an optical impression that varies depending on the viewing angle and/or angle of incidence. Apart from the high luster, the so-called brightness flop, i.e. a reduction in the brightness from the gloss angle toward more acute incidence and/or viewing angles is one of the properties that are characteristic of metal effect pigments. In the case of highly lustrous coatings, a maximum possible amount of incident light is specularly reflected and accordingly only a small portion of incident light is scattered diffusely.

By contrast, the visible light impinging on a black coating is largely evenly absorbed and only a very small portion thereof is reflected. Therefore, specular reflection is required to meet very high requirements in the case of a highly lustrous black coatings. This is achieved in practice chiefly by the use of very smooth surfaces and transparent pigments. The impression of a highly lustrous black piano lacquer can be substantially attributed to the wood surface having been ground extremely smooth in a number of worksteps.

In the industrial sector, substrates cannot be prepared using such elaborate procedures owing to cost factors. Here, rich black coatings are usually achieved by using black pigments such as carbon black, with a small admixture of metal effect pigments.

In the quest for novel black effect pigments, there is maximum interest in pigments which provide a black and also metallic impression such as a metallic flop. Furthermore, they should preferably have a blue cast. The black coatings known in the prior art often exhibit an undesirable brown cast in the case of very obtuse incidence and/or viewing angles.

It has been found, very surprisingly, that novel dark metallic effect pigments showing a hitherto unachievable flop behavior can be obtained when they have a substantially homogenous chemical composition comprising at least one metal M (one or more metals M) and an average content of oxygen ranging from 25 to 58 atomic percent, based on the total content of M and oxygen. The pigments are preferably produced by PVD techniques since these are conducive to extremely smooth surfaces.

Said pigments are effect pigments comprising only one optically effective layer. That is, these pigments are not conventional pigments in which the optical effect is caused by the interaction of different layers in a layer structure. Therefore, there is no need for conventional interference layers for achieving the dark, preferably black, color impression.

In a preferred embodiment, the average content of oxygen is from 30 to 58 atomic percent, and preferably from 30 to 57 atomic percent, more preferably from 35 to 56 atomic percent and most preferably from 40 to 55 atomic percent, always based on the total content of M and oxygen. The measured values are average values taken across the entire pigment thickness and for different pigments. In certain parts of the pigment, the oxygen concentration might deviate therefrom considerably. In particular, the concentration of oxygen at the pigment surface can be higher due to the formation of a natural oxide layer of the metal. Since this oxide layer usually has a thickness of only a few nanometers, it is not an optically effective layer for the purposes of the invention.

The dark color impression of the pigments of the invention cannot be achieved with an oxygen content below 25 atomic percent or above 58 atomic percent. If the oxygen content falls below 25 atomic percent, the effect pigment will distinctly have a largely metallic character as regards its optical properties, with the intrinsic color of the metal being mainly apparent. On the other hand, if the oxygen content exceeds 58 atomic percent, the pigments lose their metallic character and achieve a largely oxidic character, due to which they become transparent to a large extent.

The effect pigments of the invention are by no means pure, stoichiometric metal oxides. Rather, surprisingly, the pigments have a metallic character, as regards their optical properties. This includes the typical, very strong absorption of electromagnetic radiation in the infrared, visible, and UV wavelength ranges. This is combined with a typically high covering capacity, metallic luster, and, surprisingly, an extremely high brightness flop. The high content of oxygen is presumably attributable to the formation of oxides and/or sub-oxides. The pigments have no specific molecular structure. They can be in the form of a sub-stoichiometric oxide or a mixture of metal and oxide. The pigments are preferably of the nature of "metallic glass particles". The pigments of the invention may be referred to as "metallic glass particles", since they can have an X-ray amorphous character, as can be determined by means of X-ray diffractometry.

As regards their mechanical properties, the effect pigments of the invention tend to be brittle and are thus comparable to oxides or glass particles.

In comparison with known PVD metal pigments, they offer application advantages. PVD metal pigments tend to curl due to their thinness and the ductility of the metal. Although they can superbly "cling" to a substrate on account of their flexibility, while a small portion of the pigments is always deformed after application or even "curled" in extreme cases once the binder has cured. This phenomenon is accompanied by deterioration in the optical quality of the pigments. Furthermore, they are mechanically unstable, which is manifested in their sensitivity to the effect of strong shear forces, for example. WO 99/35194 describes metallic PVD pigments which are supported on both sides by layers composed of a dielectric such as $SiO_2$ for improving their mechanical properties. The dielectric layers are likewise applied to the metal layer by PVD techniques. This is a very complicated process, the economical efficiency of which suffers particularly from the fact that metal oxide layers require much more time to be vaporized than metal layers.

The effect pigments of the invention show the desired mechanical rigidity in only one layer. The pigments do not curl and they exhibit a very uniform appearance along their length with smooth surfaces devoid of any corrugation or bulging.

Furthermore, their mechanical stability is an advantageous factor for the production of the pigments of the invention, since it considerably facilitates the comminution of the metal layers to produce pigments.

The metal M is preferably selected from the group consisting of aluminum, magnesium, chromium, silver, copper, zinc, tin, manganese, iron, cobalt, titanium, tantalum, molybdenum, and mixtures and alloys thereof. The aforementioned metals are conducive to the dark properties observed. Aluminum and its alloys and chromium are particularly preferred.

The total content of metal M and oxygen in the effect pigment of the invention ranges from 90 to 100 atomic percent, preferably from 95 to 100 atomic percent and more preferably from 98 to 100 atomic percent. The remaining portions can be derived from other metals or even silicon, as may typically be present in the commercially pure forms of the metal M. However, these remaining portions can alternatively be non-metals, for example nitrogen, boron, carbon (carbide), hydrogen and/or sulfur.

The aforementioned atomic percentages are based on the effect pigment without any secondary coatings such as may be applied for increasing its resistance to corrosion.

The oxygen content can be determined by different methods. It is preferably determined by EDX analysis (energy dispersive X-ray analysis). For this purpose, a device is preferably used which is integrated in an electron microscope, an example thereof being EDAX Genesis, version 3.60, supplied by EDAX.

The method of analysis is described below:

In EDX analysis, the scanning electron beam of the electron microscope penetrates the sample surface to a depth depending on the energy of the beam and the material involved, and transfers its energy to the atoms in the material. Due to the high energy of the beam electrons, electrons are knocked loose from those shells (K-shell or L-shell) of the excited atoms that are closest to the nucleus. During this process, X-radiation is caused by two types of mechanism. Strong deceleration of the electrons produces continuously distributed radiation—the braking radiation. Refilling of the shells generates a discrete X-ray spectrum—the characteristic line spectrum of the atom. The elements can be clearly identified on the basis of these line spectra.

The X-ray spectrum emitted by the sample being examined is measured by means of an energy-dispersive X-ray spectrometer. It consists of the background braking radiation and a series of X-ray spectral lines. The emitting elements can be determined from the position of the lines, and the height of the lines is a measure of their relative contents in the sample.

In EDX elemental analysis, a few important limitations must be observed for taking correct readings of the elemental contents. The samples being examined
 a) must be homogeneous in terms of their composition,
 b) must be thick enough for the scanning electron beam to be completely absorbed by the sample, and
 c) must be freely accessible to the electron beam without disturbing factors being caused by a matrix and/or a substrate.

The higher the atomic number of the elements, the stronger the bond between the electrons close to the nucleus. Thus the energy required for ionization increases with the atomic number. The kinetic energy of the electron beam must be adapted to suit the elements being analyzed. The penetration depth of the electron beam entering the material to be examined depends on the energy of the beam. The electron beam enters the sample with an intensity distribution in the shape of a pear ("excitation pear"). This can be observed when analyzing thin layers since they are easily penetrated by high-energy electrons. If thin layers (of a thickness below 250 nm) are to be measured, the kinetic energy must be only a few KeV. Therefore, it is necessary to switch to excitation of the higher shells in the case of heavier elements. The analysis must then be performed by evaluating the L- or M-lines of the elements.

Specifically, the approach followed when analyzing thin-layered, platelet-shaped pigments is as follows, and the EDX measuring unit must be calibrated prior to carrying out analysis with the help of suitable commercially available standards.

The thickness of the layer to be examined must be determined with the aid of images created with an electron microscope. An elemental analysis at high voltage (from approx. 10 to 20 kV) provides information on all elements present in the examined sample and also on other elements present in the supporting substrate. Based on the thickness and elemental composition of the layer and with the help of a Monte Carlo simulation program (EDAX Flight-E, Version 3.1-E), the electron energy can be determined at which the volume of the layer is saturated by the penetrating electron beam without the latter breaking through the material. In such a case, the excitation pear has maximum volume.

In the next step, it is necessary to determine whether X-ray lines are excited at this beam energy and, if so, which. The kinetic excitation energy may possibly have to be adapted somewhat according to the spectral lines observed.

A first test measurement using the parameters thus determined must be performed and analyzed. If X-ray lines of elements present in the substrate can be detected in the spectrum, then the beam energy used is too high and must be corrected.

Now several measurements are performed on the layer using a gradually increasing beam voltage, and the readings are evaluated. The elemental contents determined should deviate only marginally. If the portion of light elements in the analysis results begins to drop noticeably as the voltage increases, the beam energy is too high and must be reduced.

Measurements are performed and the elemental contents are determined at several points on the layer using the optimum parameters thus determined. The measurement results must be checked for plausibility and the deviation of the readings should not exceed approx. 5%.

Another method of determining the oxygen content is the ESCA method (electron spectroscopy for chemical analysis) or Auger Spectroscopy, each in combination with a sputtering technique. In this case, it is also possible to provide a penetration profile of the elemental composition with increasing thickness of the effect pigment. It is thus possible to differentiate between the oxygen content at the surface of the pigment and that in the interior thereof.

In general, the two methods provide values that are in mutual agreement. Should the values not be in agreement and deviate from each other by more than, say, 10% then the EDX method must be given preference in case of doubt.

The average geometric thickness of the metallic effect pigments of the invention ranges preferably from 25 to 250 nm, more preferably from 30 to 200 nm, even more preferably from 40 to 150 nm and most preferably from 50 to 130 nm.

When the layer thickness is below 25 nm, the pigments are too transparent and excessively sensitive to mechanical influences. When the layer thickness exceeds 250 nm, the coverage increasingly deteriorates and no further advantages are to be gained whatsoever. In addition, production processes involving physical vapor deposition are becoming increasingly uneconomical. The average thickness of a suitably prepared sample can be determined by randomly selecting an area having a sufficiently large number of pigment particles (at least 20), as counted by means of an SEM.

In the case of pigments having a layer thickness of approx. 100 nm or more, use can be made of the spreading index method for determining the layer thickness. This method can be carried out, for example, by using the technique described in Th. Rehner and Klimits; *farbe + lack* 62 (1956(10)) page 464 or in Th. Rehner *farbe + lack* 71 (1965(8)) page 649 or the method used for very thin pigments described in DE 103 15 775 A1. However, to achieve this end, the density of the samples must be determined separately, for instance with the aid of He pycnometry.

The effect pigments of the invention are always platelet-shaped. Their length, which is expressed by the $d_{50}$ value of the cumulative distribution curve, usually ranges from 2 to 250 µm, preferably from 5 to 150 µm and more preferably from 7 to 50 µm. The particle size distribution is usually measured using laser diffraction methods.

The metallic effect pigments of the invention have form factors ranging from 40 to 1,500, preferably from 180 to 1,000 and more preferably from 200 to 500. The form factor is defined as the ratio of the $d_{50}$ value of the cumulative distribution curve to the average thickness of the platelet-shaped pigments.

Surprisingly, the effect pigments of the invention exhibit an extremely high brightness flop. This can be determined with the aid of drawdowns. The drawdowns are obtained in preferably conventional, i.e. anhydrous, enamel systems without adding other effect and/or color pigments or delustering agents. It is particularly preferred to use nitrocellulose enamels, such as the commercially available nitrocellulose enamel Dr. Renger Erco Bronzemischlack 2615e supplied by Morton. The concentration of the effect pigment should be high enough to give a drawdown showing good coverage and ranges from 1 to 8% by weight, depending on the type of metal involved, the content of metal, and the layer thickness.

These drawdowns are used to determine the brightness values and the flop index value as defined by the CieLab color system. The brightness is measured using a multi-angle calorimeter, for example, a goniospectrophotometer supplied by Optronic Multiflash, Berlin, at a constant incidence angle of 45° and at different viewing angles relative to the gloss angle and the L*-indices are determined. Viewing angles of 15°, 25°, 45°, and 110° are particularly relevant.

The brightness flop is defined by DuPont according to the following formula (A. B. J. Rodriguez, *JOCCA*, (1992(4)) pages 150 to 153):

$$\text{Flop index} = 2.69 \times \frac{(L^*_{15°} - L^*_{110°})^{1.11}}{(L^*_{45°})^{0.86}}$$

The flop index values of the effect pigments of the invention range from 23 to 55, preferably from 25 to 50 and more preferably from 30 to 45. The pigments appear relatively bright near the gloss angle in a manner that is comparable to aluminum pigments produced using conventional grinding processes. But as the viewing angles become more acute, the brightness values drop very rapidly, and at a viewing angle of 45° they attain values that come close to those of black coatings. This results in such unusually high flop index values.

However, high luster aluminum pigments produced using PVD techniques and representing the most brilliant effect pigments obtained hitherto, are known to have flop index values ranging from 20 to approx. 30 in corresponding applications.

In general, the flop index values of the effect pigments of the invention are thus distinctly higher, but in some cases they overlap the flop index values of pigments disclosed in the prior art. Brightness indices $L^*_{45°}$ are therefore used as coefficients for further characterization. The $L^*_{45°}$ index values of the effect pigments of the invention range from 6 to 30, preferably from 7 to 25 and more preferably from 8 to 20 lambert. These very low values substantiate the strong flop to dark. Metallic PVD pigments known in the prior art have $L^*_{45°}$ index values of more than 35.

In a preferred embodiment, the metal M substantially comprises chromium with an average oxygen content ranging from 40 to 52 atomic percent and preferably from 42 to 48 atomic percent, always based on the total content of chromium and oxygen. These pigments have unusually high flop index values ranging from 35 to 55 and preferably from 37 to 45, and have a slight blue cast. The $L^*_{45°}$ index values range from 6 to 25, preferably from 7 to 25 and more preferably from 8 to 15.

Furthermore, they show outstanding stability in stress tests such as the condensation water test specified in DIN 50 017 (condensed water in a constant climate) including high adhesive strength (cross-cut test) as specified in DIN EN ISO 2409. Outstanding results are likewise achieved in UV stress tests such as the QUV test.

The analytically detectable contents of soluble Cr(IV) compounds which could cause toxicological problems are far below 1 ppm.

In another preferred embodiment, the metal M comprises substantially aluminum with an average oxygen content ranging from 35 to 55 atomic percent, preferably from 40 to 51 atomic percent and more preferably from 42 to 50 atomic percent, always based on the total content of M and oxygen.

The effect pigments of the invention have a very smooth surface. Therefore, minimum scattering effects are induced in the application medium, and relatively high luster is achieved despite the dark color.

In order to stabilize the effect pigments of the invention, in particularly for use in water-based enamels or aqueous printing inks, they can be optionally coated with an anti-corrosive layer and are preferably fully enclosed therein.

Commonly used methods can be implemented for this purpose, such as treatment with organically modified phosphoric acids and/or phosphonic acids and/or derivatives thereof. Furthermore, the formation of a chromated layer, treatment with vanadium compounds and/or molybdenum compounds, and a combination of such methods is also suitable. Moreover, coating the effect pigments with polymers or with metal oxides is also possible. The metal oxides preferably comprise $SiO_2$, boron oxides, aluminum oxides, and include the hydroxides and oxyhydrates thereof.

In a particularly preferred embodiment, the anti-corrosive layer, which preferably fully encloses the effect pigments of the invention, comprises $SiO_2$. Particular preference is given to a layer applied to the effect pigment using sol gel methods such that it fully encloses the effect pigment.

In other embodiments, the effect pigments of the invention thus protected from corrosion can also show organochemical surface modifications effected by, say, silanes, titanates, or aluminates. Such surface modifications can render the effect pigments compatible with the ambient application medium. For example, such an organochemical secondary coating can give rise to chemical bonding between the effect pigments and the binders of enamels or paints, thereby providing covalent bonding of the effect pigments of the invention.

A method for producing the metallic effect pigments of the invention comprises the following steps:

a) Vapor-coating a preferably moving substrate, which can be in the form of a web, in a vacuum chamber by means of physical vapor deposition (PVD) with at least one metal M in the presence of oxygen to form a metal layer on the substrate, which metal layer has a substantially homogeneous chemical composition having an average content of oxygen of from 25 to 58 atomic percent, based on the total content of M and oxygen, b) detaching the metal layer from the substrate, preferably in an organic solvent, c) comminuting the metal layer to form pigments, preferably in an organic solvent, d) optionally converting the metallic effect pigments to a dispersion or paste.

The dispersion is likewise preferably in an organic solvent. In a variant of the method of the invention, the proportion of organic solvent in the dispersion is at least 70% by weight.

The effect pigments of the invention can also be present in a more concentrated form, such as a paste. In this case the solvent content is not more than 60% by weight and preferably not more than 50% by weight, based on the metal effect pigment paste.

The substrate may be vapor-coated with metal by the use of electron beam technology or resistance-heating or radiation heating techniques.

The metal is preferably vapor-deposited on to a moving sheet to form a foil showing metallic luster which can be detached from the sheet later. The brightness index L* of the metal foil can be determined on the sheet, and it is possible to determine the brightness index either through the sheet or directly at the surface of the metal foil employing diffuse measurement geometry and using a calorimeter. The brightness indices obtained do not differ substantially. The brightness indices L* are preferably above 30, more preferably above 40 and most preferably above 50.

The thickness of the metal layers can be monitored by way of transmission measurements. Due to the partly oxidic character of the sheeting, the transmission values are usually lower than those obtained when vaporizing pure metals.

If an alloy is used instead of a metal M, this alloy is either produced from separate evaporators (flash evaporation, jumping beam evaporation or the like) by causing concomitant condensation of the metals or by means of suitable evaporating methods such as sputtering or electron beam techniques, for example.

In the vapor-coating step, the oxygen can be provided by several different methods. These methods include supplying molecular oxygen from atmospheric oxygen or controlled metering of oxygen gas to the vacuum chamber. The latter is referred to as reactive physical vapor deposition. Alternatively, water present in the vacuum chamber can be used as the oxygen source. The water may originate from the atmosphere or from a water-storage material. Examples of suitable water-storage materials are hydrate compounds. The hydrate compound must show sufficiently low volatility in order to prevent deposition of the hydrate compound itself. However, the hydrate compound advantageously releases water, for which the application of heat may possibly be necessary. Furthermore, the metered addition of steam into the vacuum chamber is also possible during vapor deposition. Moreover, oxygen can originate from the preferably moving substrate, for example, moving sheeting, onto which a release coat followed by the metal are vapor-deposited. Naturally, oxygen can be made available by using any combination of these alternatives, if desired.

The vacuum in step a) must be relatively high. The vacuum preferably ranges from $2\times10^{-4}$ to approx. $1\times10^{-1}$ mbar, more preferably from $5\times10^{-4}$ to $1\times10^{-2}$ mbar and most preferably from $7\times10^{-4}$ to $5\times10^{-3}$ mbar. By contrast, when producing PVD metal pigments disclosed in the prior art, the metals are usually vaporized in a vacuum of $1\times10^{-4}$ mbar or less depending on the production method used.

The chamber vacuum is individually dependent on the volume of the deposition chamber, the width and advance rate of the sheeting, and the supply rate (partial pressure) of the oxygen source. The proportions of metal and oxygen in the mixture at the site of deposition on the substrate must be correct, and the person skilled in the art will therefore regulate the vacuum accordingly.

The layer composed of metal and oxygen and vapor-deposited in the manner defined by the invention, is distinctly brittle. This is of great advantage for steps b) and c) of the present method. The layer can be detached very readily and can be comminuted to pigments of the desired size without difficulty. During comminution, sharp break edges are produced, and this contributes to low scattering effects at these edges and thus to optimum optical quality of the effect pigments of the invention.

The metallic effect pigments of the invention are used in coatings, enamels, automobile enamels, powder enamels, printing inks, digital printing inks, plastics, and cosmetic formulations, particularly in nail polishes.

The following examples will explain the invention more fully without restricting its scope.

EXAMPLE 1

An embodiment of the invention was produced using a PVD conveyor belt system (see FIG. 1). The chamber volume is approx. 1.5 m$^3$. The vacuum is generated with the aid of two forepumps (each supplied by Edwards) and a diffusion pump (supplied by Varian).

FIG. 1 shows a diagrammatic representation of a belt conveyor system. The belt conveyor system comprises a source roll 1 containing sheeting provided with a release coat. The sheeting is directed by idler 2 through the aperture inlet 9 into the chamber for physical vapour deposition and through the aperture outlet 10 and over the idler 3 to the take-up roll 4. The metal is vaporized from the vaporization boat 8, wherein the rate of application is monitored using an oscillating crystal measurement 7. The layer thickness of the vapour-deposited metal is calculated from transmission measurement 5/6 of the coated sheeting.

A 40 cm wide polyethylene terephthalate (PET) sheet having a thickness of 23 μm and provided with a release coat was used for coating purposes. The release coat consisting of acetone-soluble methyl methacrylate resin was applied in advance in a separate workstep.

The sheet was moved at a rate of advance of 0.5 m/min and chromium was deposited thereon by resistance heating. The rate of application was monitored using an oscillating crystal measuring apparatus (Model FTM7, supplied by Edwards) and the layer thickness was controlled via the heat output and the rate of advance. During the metal coating process, pieces of cardboard saturated with water were present in the vacuum chamber (as sources of water, i.e. oxygen). These had been placed in the chamber prior to evacuation of the chamber.

Transmission measurement of the coated sheeting was performed simultaneously, from which the layer thickness of the vapor-deposited metal can be calculated.

The oxygen partial pressure for the respective layers was monitored via a constant level of the chamber vacuum. However, the oxygen content of the metal film and also of the pigments were varied via the chamber vacuum. The precise parameters are listed in Table 1.

On completion of the coating process, the vacuum chamber was ventilated and the metallized PET sheeting removed therefrom. A small part of the coated sheet was cut off and put aside for optical examination. Most of the sheeting material was dispersed in acetone in a separate releasing unit, whereby the coating was detached from the PET sheeting.

The coating was separated from the sheeting by dissolution of the release coat layer. The detached layer packages were separated by filtration and the filter cake formed was completely freed from release coat by washing with acetone. The washed layer packages were converted to a pigment suspension and comminuted to the desired particle size.

COMPARATIVE EXAMPLE 2

Example 1 was repeated except for the presence of moist pieces of cardboard and was therefore carried out under improved vacuum conditions and at a lower rate of application (cf. Table 1).

EXAMPLE 3

Example 1 was repeated except that aluminum was deposited by the use of resistance heating. For the precise process parameters, see Table 1.

EXAMPLE 4

Example 1 was repeated except that aluminum was deposited by the use of resistance heating at an advance rate of 5 m/min. For the precise process parameters, see Table 1.

TABLE 1

Process data during metal deposition:

| | Vacuum-deposited material | Chamber vacuum [mbar] | Rate of application [µg*cm$^{-2}$] | Online transmission [%] |
|---|---|---|---|---|
| Example 1 | Cr | $3.6 \times 10^{-4}$ | 67.7 | 44 |
| Comp. Example 2 | Cr | $6.0 \times 10^{-4}$ | 25.0 | 48 |
| Example 3 | Al | $1.7 \times 10^{-4}$ | 14.3 | 77 |
| Example 4 | Al | $2.6 \times 10^{-4}$ | 7.2 | 70 |

COMPARATIVE EXAMPLE 5

Commercially available PVD aluminum pigment Metalure® A 41010 AE (manufactured by Avery Dennison, distributed by ECKART GmbH & Co. KG).

EDX Measurements

The composition of oxygen and metal in all samples was determined using the measuring methods described above by means of EDX. The excitation energy of the electron beam was 3 keV in each case. The $K_\alpha$ line (excitation energy: approx. 0.5 keV) was excited for oxygen, the $L_\alpha$ line (excitation energy: approx. 0.6 keV) for chromium, and the $K_\alpha$ line (excitation energy: approx. 1.5 keV) for aluminum. In the chromium-containing samples, the close peaks were fitted by means of a software program pertaining to the device and implementing analysis by holographic peak deconvolution (HDP), and were evaluated accordingly.

ESCA/XPS Measurements

The pigments were also examined by means of ESCA with regard to their elemental composition and metal and oxygen contents. The pigments were prepared in that they were taken up in acetone and evaporated to dryness on a glass support. In this way, a largely plane-parallel orientation of the pigments was achieved. The measurements were performed using a device supplied by Thermo VG Scientific, Type ESCALAB 250. Monochromatic Al $K_\alpha$ radiation was used for excitation (15 kV, 150 W, 500 µm spot size). The transmission function of the device was measured on a copper sample. A "flood gun" having an electron energy of 6 eV/0.05 mA beam current was used for charge compensation. An overview spectrum (pass energy: 80 eV) was initially recorded. Then high-resolution spectra were measured with a pass energy of 30 eV. The samples were sputtered and then a high-resolution spectrum was measured. In this way, the penetration profiles of the composition were determined.

The average layer thickness of the samples was determined by counting the particles in a significant random area (>20 particles) under a scanning electron microscope (SEM). The estimated azimuthal angles of the individual pigment particles relative to the viewing plane were estimated and allowed for in the calculation. Only those particles were measured that were substantially perpendicular to the viewing angle.

Finally, conventional laser diffraction methods (using Cilas 1064 equipment) were used for determining the size distribution. The $d_{50}$ value was determined in the usual manner from the cumulative distribution curve as a measure of the average size.

Results:

TABLE 2

Pigment properties: Elemental composition and SEM layer thickness

| | | SEM layer | Content in atomic percent EDX analysis | | | Contents in atomic percent ESCA/XPS analysis | | |
|---|---|---|---|---|---|---|---|---|
| | $d_{50}$ values | thickness | Atomic percent | Atomic percent metal | | Atomic percent | Atomic percent metal | |
| Sample | [µm] | [nm] | oxygen | Cr | Al | oxygen | Cr | Al |
| Example 1 | 16 | 130 | 45 | 55 | | 45 | 55 | |
| Comp. Ex. 2 | 9 | 50 | 18 | 82 | | — | — | |
| Example 3 | 16 | 40 | 45 | | 55 | 45 | | 55 |
| Example 4 | 14 | 50 | 49 | | 51 | — | | — |
| Comp. Ex. 5 | 11 | 20 | 24 | | 76 | 32 | | 68 |

The comparative examples also show relatively high oxygen contents. This is a known feature of effect pigments produced by PVD methods, since the oxygen present in the sheeting material, for example, can migrate to a certain extent into the metal layer during the deposition process. But the pigments of the invention show a much higher content of oxygen by comparison.

Optical Properties:

The applied foils obtained in Examples 1, 3, and 4 of the invention and Comparative Example 2 were first characterized optically. For this purpose, the brightness index L* of the foils was measured in diffuse measurement geometry (integrating sphere) with a spectral photometer, supplied by Minolta. As substrates, test cards No. 2853 supplied by Byk Gardner (black and white contrast paper) were each used on a black background and on a or white background. The foils were measured from both sides: firstly with the metal side on top and then with the sheet side on top. The coatings all show relatively high brightness indices L*, which indicates a relatively high luster score. The values obtained for the sheeting used in Comparative Example 2 are the highest, which can be readily explained by the higher metal content of this sheeting.

FIG. 2 shows colorimetric readings-L* indices which are drawdown readings at various differential angles between 15° and 110° of Example 1 (-▲-), Comparative Example 2 (-Δ-), Example 3 (-■-), Example 4 (-●-) and Comparative Example 5 (-○-). The respective L* indices of black (-) and white (---) are incorporated in FIG. 2.

TABLE 3

Measurements using a spectral photometer (supplied by Minolta CM 508)

| Sample | L* index Metal side measured on a black background | L* index Sheet side measured on a black background | L* index Metal side measured on a white background | L* index Sheet side measured on a white background |
|---|---|---|---|---|
| Example 1 | 54 | 52 | 53 | 55 |
| Comp. Example 2 | 73 | 74 | 73 | 75 |
| Example 3 | 60 | 68 | 62 | 70 |
| Example 4 | 48 | 56 | 61 | 66 |

The respective pigment was stirred into 2 g of a conventional nitrocellulose enamel (Dr. Renger Erco Bronzemischlack 2615e, supplied by Morton). A batch of the effect pigment was taken and subsequently dispersed in the enamel using a paintbrush.

The finished enamel was applied by doctor blade to test cards No. 2853 supplied by Byk Gardner (black and white contrast paper) to produce a wet film thickness of 50 μm thereon.

The pigmentation level is selected such that a layer showing sufficient coverage is formed. Thus the background does not influence the calorimetric data.

The drawdowns are measured calorimetrically according to the manufacturer's instructions (Optronic Multiflash, Berlin). At a constant incidence angle of 45°, the L*, a*, and b* indices are determined at viewing angles of 15°, 20°, 25°, 45°, 55°, 70°, 75°, and 110° relative to the gloss angle (source of light: D65).

The brightness index values achieved at different angles are shown by the graph in FIG. 2. Furthermore, the knife-coated card is measured at a white location and at a black location and the respective L* indices were measured.

It is clearly evident that the brightness index values measured in the examples of the invention are still very high at a viewing angle of 15° but then drop very steeply. In Example 1, in particular, they almost reach the low brightness index values of the black cards at a viewing angle of 45°, and at larger viewing angles, the index values are even below those of the black card.

The brightness index values achieved in each of the comparative examples are consistently higher than those of the respective metal.

Table 4 shows the brightness indices at viewing angles of 15°, 45°, and 110°, and the flop index values calculated therefrom according to DuPont. In addition, the subjective color impression is described.

TABLE 4

Colorimetric data of drawdowns in the examples of the invention and the comparative examples

| Sample | Pigmentation level [%] | Brightness index L*15° | Brightness index L*45° | Brightness index L*110° | Flop index | Subjective Color impression |
|---|---|---|---|---|---|---|
| Example 1 | 8 | 80.7 | 11.4 | 3.7 | 41.2 | Steel-blue luster, Viewed from the side: black |
| Comp. Ex. 2 | 4 | 110.7 | 37.9 | 17.4 | 18.4 | Gray luster |
| Example 3 | 2 | 84.7 | 17.7 | 4.6 | 29.5 | Steel-gray luster |
| Example 4 | 2 | 82.3 | 20.6 | 7.1 | 24.1 | Steel-gray luster |
| Comp. Ex. 5 | 2 | 138.1 | 34.3 | 15.4 | 26.8 | Silver luster |

The effect pigments of Example 1 of the invention have a tremendous flop index of 41.2. Metallic effect pigments having such high flop indices have hitherto been virtually unknown. Furthermore, the applied enamel derived from this example shows a certain amount of blue cast. Such effects are much sought-after, since, for example, metallic black effect paints known in the prior art always have an undesirable brown cast.

On the other hand, the effect pigments of Comparative Example 2 having a lower oxygen content show a very weak flop. The aluminum sample produced in Example 3 has a higher flop index and in Example 4 a lower flop index as compared with the pure PVD aluminum pigment (Comparative Example 5). The major difference between the optical impression of the effect pigments of the invention (examples of the invention) and the effect pigments of the comparative example is manifested in their reduced brightness. Thus, the L*$_{45}$° index values of the effect pigments in the examples of the invention, for instance, are lower than those of the effect pigments of Comparative Example 5 by more than 10 units.

Very surprisingly, the applied pigments of the invention show a very strong light-to-dark flop effect. In particular, as the viewing angles and/or incidence angles become more acute, a dark (black) appearance becomes evident. This effect is much less pronounced in Comparative Example 2.

These results are therefore extremely surprising and cannot be deduced from the brightness index values of the foils.

The invention claimed is:

1. A dark metallic effect pigment, wherein said dark metallic effect pigment consists essentially of a single optically effective layer, wherein said optically effective layer has a substantially homogeneous chemical composition comprising at least one metal M and having an average content of oxygen of from 25 to 58 atomic percent, based on the total content of M and oxygen, and wherein said optically effective layer comprises a mixture of metal and oxide, and wherein the dark metallic effect pigment is a PVD pigment.

2. The dark metallic effect pigment as defined in claim 1, wherein said dark metallic effect pigment has an average content of oxygen of from 30 to 57 atomic percent, based on the total content of M and oxygen.

3. The dark metallic effect pigment as defined in claim 1, wherein said dark metallic effect pigment has an average content of oxygen of from 35 to 56 atomic percent, based on the total content of M and oxygen.

4. The dark metallic effect pigment as defined in claim 1, wherein the total content of M and oxygen is from 90 to 100 atomic percent, based on the dark metallic effect pigment.

5. The dark metallic effect pigment as defined in claim 1, wherein at least one metal M is selected from the group consisting of aluminum, magnesium, chromium, silver, copper, zinc, tin, manganese, iron, cobalt, titanium, tantalum, molybdenum, and mixtures and alloys thereof.

6. The dark metallic effect pigment as defined in claim 1, wherein said dark metallic effect pigment has an average thickness of from 25 nm to 250 nm.

7. The dark metallic effect pigment as defined in claim 1, wherein said metal M consists substantially of chromium and has an average content of oxygen of from 35 to 48 atomic percent, based on the total content of chromium and oxygen.

8. The dark metallic effect pigment as defined in claim 1, wherein said metal M consists substantially of aluminum and has an average content of oxygen of from 30 to 55 atomic percent, based on the total content of aluminum and oxygen.

9. The dark metallic effect pigment as defined in claim 1, wherein said dark metallic effect pigment is coated with an anti-corrosive layer.

10. The dark metallic effect pigment as defined in claim 9, wherein the anti-corrosive layer comprises $SiO_2$.

11. A method for the production of a metallic effect pigment as defined in claim 1, wherein said method comprises the following steps:
   a) applying at least one metal M to a substrate in a vacuum chamber by physical vapor deposition (PVD) in the presence of oxygen to form a metal coating on the substrate, said coating having a substantially homogeneous chemical composition with an average content of oxygen of from 25 to 58 atomic percent, based on the total content of M and oxygen,
   b) detaching said metal coating from the substrate,
   c) comminuting said metal coating to form metallic effect pigments,
   d) optionally converting said metallic effect pigments to a dispersion or paste.

12. The method for the production of a metallic effect pigment as defined in claim 11, wherein oxygen is present in said vacuum chamber in the form of water and/or atmospheric oxygen.

13. The method for the production of a metallic effect pigment as defined in claim 11, wherein during step a) controlled metering of oxygen gas into said vacuum chamber is carried out.

14. The method for the production of a metallic effect pigment as defined in claim 11, wherein step a) is carried out under a vacuum pressure of from $2 \times 10^{-4}$ to $1 \times 10^{-1}$ mbar.

15. The method for the production of a metallic effect pigment as defined in claim 11, wherein step b) and/or c) is/are carried out in a solvent, preferably an organic solvent.

16. The method for the production of a metallic effect pigment as defined in claim 11, wherein in step d) said metallic effect pigments are converted to a dispersion with a preferably organic solvent, the content of the said preferably organic solvent being at least 70% by weight, based on the total weight of the dispersion.

17. The dark metallic effect pigment as defined in claim 9, wherein said dark metallic effect pigment is fully enclosed in said anti-corrosive layer.

18. The dark metallic effect pigment as defined in claim 9 wherein the anti-corrosive layer consists of $SiO_2$.

\* \* \* \* \*